(12) United States Patent
Zhong et al.

(10) Patent No.: US 12,320,024 B2
(45) Date of Patent: Jun. 3, 2025

(54) OZONE ELECTROLYSIS CELL AND OZONE ELECTROLYSIS CELL APPLICATION MODULE

(71) Applicant: GUANGZHOU DEPOSON ELECTRIC TECHNOLOGY CO., LTD., Guangdong (CN)

(72) Inventors: Jianhua Zhong, Guangdong (CN); Wenying Zhang, Guangdong (CN); Yufu Pan, Guangdong (CN)

(73) Assignee: GUANGZHOU DEPOSON ELECTRIC TECHNOLOGY CO., LTD., Guangzhou (CN)

( * ) Notice: Subject to any disclaimer, the term of this patent is extended or adjusted under 35 U.S.C. 154(b) by 491 days.

(21) Appl. No.: 17/732,544

(22) Filed: Apr. 29, 2022

(65) Prior Publication Data
US 2022/0251719 A1   Aug. 11, 2022

Related U.S. Application Data

(63) Continuation of application No. PCT/CN2020/089484, filed on May 9, 2020.

(30) Foreign Application Priority Data

Mar. 27, 2020   (CN) .......................... 202010229939.0

(51) Int. Cl.
*C25B 9/23*     (2021.01)
*C25B 1/13*     (2006.01)
(Continued)

(52) U.S. Cl.
CPC .................. *C25B 9/23* (2021.01); *C25B 1/13* (2013.01); *C25B 9/63* (2021.01); *C25B 9/70* (2021.01);
(Continued)

(58) Field of Classification Search
CPC ....................................................... C25B 1/13
See application file for complete search history.

(56) References Cited

U.S. PATENT DOCUMENTS

| 5,779,865 A | * | 7/1998 | Schulze | .................... C25B 1/04 |
| | | | | 205/633 |
| 6,315,886 B1 | * | 11/2001 | Zappi | .................. C02F 1/46109 |
| | | | | 204/266 |

(Continued)

FOREIGN PATENT DOCUMENTS

| CN | 109487293 A | * | 3/2019 | ................ C02F 1/78 |
| CN | 110846674 A | * | 2/2020 | ................ C25B 1/13 |
| WO | WO-2021189613 A1 | * | 9/2021 | ................ C25B 1/13 |

OTHER PUBLICATIONS

Machine translation of Pan CN 109487293 A (Year: 2019).*
Machine translation of Pan CN 110846674 A (Year: 2020).*

*Primary Examiner* — Harry D Wilkins, III
(74) *Attorney, Agent, or Firm* — Hemisphere Law, PLLC; Zhigang Ma

(57) ABSTRACT

Disclosed is an ozone electrolysis cell, comprising a shell. A water inlet and a water outlet are formed in two ends of the shell respectively. An electrolysis cavity is formed in the shell. At least one electrode holder is disposed in the electrolysis cavity. At least one electrolysis assembly is disposed on the electrode holder. The electrolysis assembly comprises an anode, a proton exchange membrane and a cathode. A water gap is reserved between the electrolysis assembly and an inner wall of the electrode holder. A first water hole is formed in the anode. A second water hole is formed in the proton exchange membrane. An elastic member having two ends abutting against the cathode and an inner wall of the shell respectively is disposed in the (Continued)

electrolysis cavity. The bottom of the electrode holder faces the water inlet. Also disclosed is an ozone electrolysis cell application module.

9 Claims, 4 Drawing Sheets

(51) Int. Cl.
*C25B 9/63* (2021.01)
*C25B 9/70* (2021.01)
*C25B 11/03* (2021.01)
*C25B 11/043* (2021.01)
*C25B 11/046* (2021.01)
*C25B 15/08* (2006.01)

(52) U.S. Cl.
CPC ............ *C25B 11/03* (2013.01); *C25B 11/043* (2021.01); *C25B 11/046* (2021.01); *C25B 15/08* (2013.01)

(56) References Cited

U.S. PATENT DOCUMENTS

| | | | | |
|---|---|---|---|---|
| 2015/0129419 A1* | 5/2015 | Sekiguchi | ............. | C02F 1/4672 |
| | | | | 204/252 |
| 2019/0352788 A1* | 11/2019 | Shyu | ......................... | C25B 1/04 |
| 2022/0098745 A1* | 3/2022 | Okada | ..................... | C25B 13/08 |

* cited by examiner

OZONE ELECTROLYSIS CELL AND OZONE ELECTROLYSIS CELL APPLICATION MODULE

CROSS REFERENCE TO RELATED APPLICATIONS

The present application is a Continuation Application of PCT Application No. PCT/CN2020/089484 filed on May 9, 2020, which claims the benefit of Chinese Patent Application No. 202010229939.0 filed on Mar. 27, 2020. All the above are hereby incorporated by reference in their entirety.

BACKGROUND OF THE INVENTION

1. Technical Field

The invention belongs to the technical field of ozone preparation, and particularly relates to an ozone electrolysis cell.

2. Description of Related Art

Ozone is a popular and effective bactericide acknowledged around the world. When the concentration of ozone in water or air reaches a certain concentration, bacteria in water or air will be rapidly killed by ozone, and more importantly, ozone will be reduced into oxygen after killing bacteria, thus being an environmentally friendly disinfectant. Ozone can be dissolved in water to form ozone water, which not only can kill bacteria in water and decompose hazardous pollutants in water such as organic matter, but also can decolorize water to some extent.

At present, ozone is widely used in the industries and fields such as sterilization of drinking water and medical water, sewage treatment, air sterilization in food factories and pharmaceutical factories, and bleaching for papermaking in many countries and regions, and some small household ozone electrical appliances have been used by people daily life.

In the prior art, for the sake of a simple internal structure, electrodes of existing ozone generators are disposed close to a PEM, which impede the flowing of ozone water generated by electrolysis, so the heat dissipation performance is unsatisfying, the concentration of ozone water generated in unit area cannot be increased, and the PEM may be damaged due to the poor heat dissipation performance of the electrodes. In addition, the treatment of scale on the surfaces of the electrodes has become a common research hotspot in the field. An existing common solution to this is to make holes in electrodes where scale may be formed, use pure water as raw material and increase the water velocity, so as to promote scale to be flushed and discharged in time.

According to existing applications for preparing ozone water through an electrolytic method, the design of an electrolysis cavity cannot meet production requirements, thus greatly limiting the application range of ozone. So, the optimization of the electrolysis structure is of great significance.

BRIEF SUMMARY OF THE INVENTION

The objective of the invention is to provide an ozone electrolysis cell to solve the problems mentioned in the description of related art.

The objective of the invention is realized through the following technical solution:

An ozone electrolysis cell, comprising a shell, a water inlet and a water outlet are formed in two ends of the shell respectively, an electrolysis cavity is formed in the shell, at least one electrode holder is disposed in the electrolysis cavity, at least one electrolysis assembly is disposed on the electrode holder, the electrolysis assembly comprises an anode, a proton exchange membrane and a cathode which are mounted on electrode holder sequentially from bottom top, a water gap is reserved between the electrolysis assembly and an inner wall of the electrode holder, a first water hole is formed in the anode, a second water hole corresponding to the first water hole is formed in the proton exchange membrane, the first water hole is smaller than the second water hole, an elastic member is disposed in the electrolysis cavity, two ends of the elastic member abut against the cathode and an inner wall of the shell respectively, and a bottom of the electrode holder faces the water inlet.

In a preferred solution of the invention, a water manifold is disposed at the bottom of the electrode holder, and a plurality of third water holes corresponding to the first water hole are formed in the water manifold.

In a preferred solution of the invention, a mounting groove is formed in the bottom of the electrode holder, a mounting protrusion is disposed on an edge of the water manifold, and the mounting protrusion is inlaid in the mounting groove to connect and fix the water manifold to the bottom of the electrode holder.

In a preferred solution of the invention, an electrode fixing member is disposed on the electrode holder, and electrolysis assembly mounting sites are formed between the electrode fixing member and an inner wall of the electrode holder.

In a preferred solution of the invention, four said electrolysis assemblies are disposed on the electrode holder, and two said electrolysis assemblies are located on each of two sides of the electrode fixing member.

In a preferred solution of the invention, a conductive chip and a block are disposed on a surface of the electrode fixing member, the conductive chip is provided with a power pin stretching out of the electrolysis cavity and multiple conductive pins attached to surfaces of the anodes, and the block is pressed against a surface of the conductive chip.

In a preferred solution of the invention, a plurality of locating posts are disposed on the surface of the electrode fixing member, and locating holes matched with the locating posts are formed in the surface of the conductive chip and a surface of the block.

In a preferred solution of the invention, the anode is a diamond anode, and the cathode is a stainless steel cathode.

In a preferred solution of the invention, the shell comprises a water inlet cover and a water outlet cover, the water inlet cover and the water outlet cover are fixedly connected to an edge of an upper surface and an edge of a lower surface of the electrode holder respectively, and the electrolysis cavity is formed between the water inlet cover and the water outlet cover.

In a preferred solution of the invention, multiple ozone electrolysis cells are disposed on a circumferential wall of the water pipe, and the water outlets of the ozone electrolysis cells are communicated with an interior of the water pipe.

Compared with the prior art, the technical solution of the invention has the following advantages:

1. According to the ozone electrolysis cell, the anode is disposed close to the water inlet, so that a water flow can eject the cathode open after flowing through the anode and the proton exchange membrane, and a gap is formed between the cathode and the proton exchange membrane; moreover, the first water hole is smaller than the second water hole, so that the water flow enables a gap to be formed between the anode and the proton exchange membrane under a reactive force of the cathode after ejecting the cathode open, and the gaps facilitate the flowing of ozone water generated by electrolysis, so that the heat dissipation performance is good, the ozone water concentration in unit area is increased, and the proton exchange membrane does not cling to the electrodes all the time and thus is prevented from being damaged.

2. When the ozone electrolysis cell is used for preparing ozone water, the cathode is always in a micro-oscillation state under the action of the water flow and the elastic member, so scale will not be accumulated on the surface of the cathode and can be discharged in time through the gap formed between the anode and the proton exchange membrane, and thus, the service life of the electrodes is prolonged.

3. According to the ozone electrolysis cell application module of the invention, multiple ozone electrolysis cells can be used at the same time, so that high-concentration ozone water can be generated at a high rate within a short time, and the application range is wide

BRIEF DESCRIPTION OF THE SEVERAL VIEWS OF THE DRAWINGS

To more clearly explain the technical solutions of the embodiments of the invention or the prior art, drawings used for describing the embodiments of the invention or the prior art are briefly introduced below. Obviously, the drawings in the following description merely illustrate some embodiments of the invention, and those skilled in the art may obtain other drawings according to the structures shown in the following drawings without creative labor.

Figure 1:
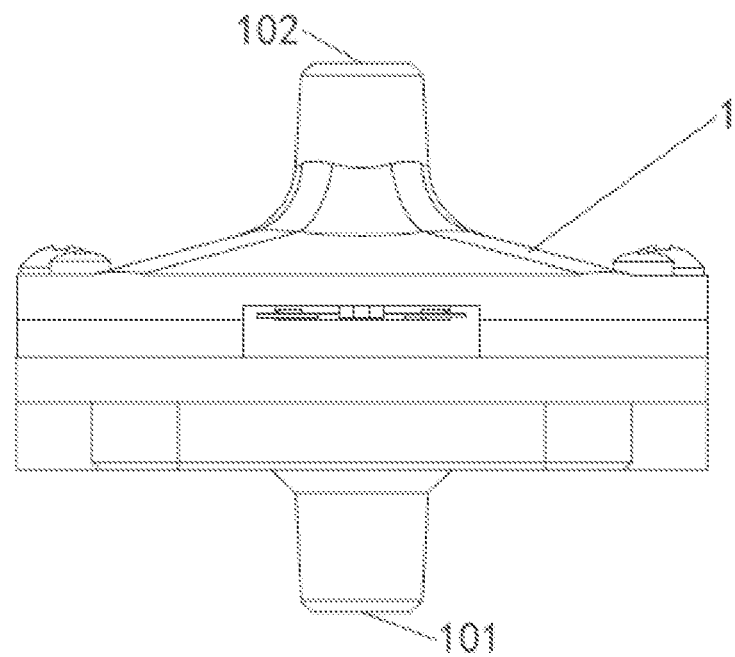
FIG. 1 is an external diagram of an ozone electrolysis cell according to the invention.
Figure 2:
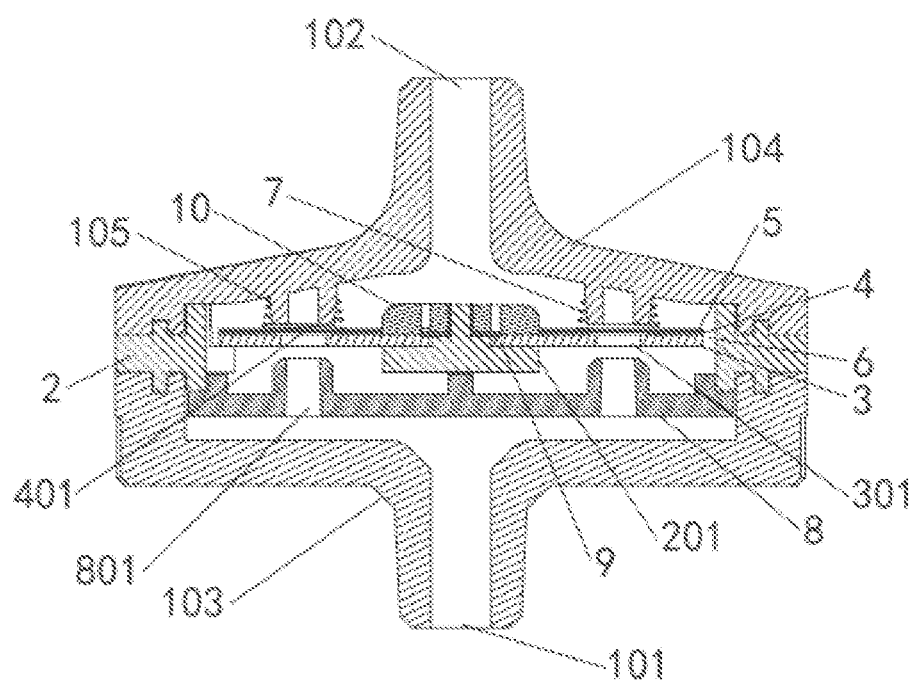
FIG. 2 is an internal structural diagram of the ozone electrolysis cell provided with one electrode holder according to the invention.

The realization of the objectives of the invention, and the functional features and advantages of the invention will be explained in detailed in conjunction with embodiments and accompanying drawings.

DETAILED DESCRIPTION OF THE INVENTION

The invention provides an ozone electrolysis cell.

Referring to FIG. 1 to FIG. 5, this embodiment provides an ozone electrolysis cell, which comprises a shell 1, wherein a water inlet 101 and a water outlet 102 are formed in two ends of the shell 1 respectively, an electrolysis cavity is formed in the shell 1, at least one electrode holder 2 is disposed in the electrolysis cavity, and in this embodiment, one electrode holder 2 is disposed in the electrolysis cavity; at least one electrolysis assembly is disposed on the electrode holder 2, the electrolysis assembly comprises an anode 3, a proton exchange membrane 4 and a cathode 5 which are mounted on electrode holder 2 sequentially from bottom top, and in this embodiment, four electrolysis assemblies are disposed on the electrode holder 2, and two electrolysis assemblies are distributed on each of two sides of an electrode fixing member 201; a water gap 6 is reserved between the electrolysis assembly and an inner wall of the electrode holder 2, a first water hole 301 is formed in the anode 3, a second water hole 401 corresponding to the first water hole 301 is formed in the proton exchange membrane 4, the first water hole 301 is smaller than the second water hole 401, an elastic member 7 is disposed in the electrolysis cavity, two ends of the elastic member 7 abut against the cathode 5 and an inner wall of the shell 1 respectively, and the bottom of the electrode holder 2 faces the water inlet 101. In the electrolysis process, ozone and oxygen will be generated between the anode 3 and the proton exchange membrane 4, hydrogen will be generated between the cathode 5 and the proton exchange membrane 4, small gaps will be formed between the anode 4 and the proton exchange membrane 4 as well as between the cathode 5 and the proton exchange membrane 4 under the action of these gases, and the anode 3 is disposed close to the water inlet 101, so that a water flow can eject the cathode 5 open after flowing through the anode 3 and the proton exchange membrane 4, and the gap between the cathode 5 and the proton exchange membrane 4 will be further expanded; moreover, the first water hole 301 is smaller than the second water hole 401, so that the water flow can further expand the gap between the anode 3 and the proton exchange membrane 4 under a reactive force of the cathode 5 after ejecting the cathode 5 open, and thus, the heat dissipation performance is good; gases and ozone water generated in the electrolysis process can be discharged via the expanded gaps, and thus, the ozone water concentration in unit area is increased; and the proton exchange membrane 4 does not cling to the electrodes all the time and is prevented from being damaged, so the service life of the proton exchange membrane 4 is prolonged. In addition, under the action of the water flow and the elastic member 7, the cathode 5 is always in a micro-oscillation state, so scale will not be accumulated on the surface of the cathode 5 and can be discharged in time through the gap formed between the anode 3 and the proton exchange membrane 4, and thus, the service life of the electrodes is prolonged. Moreover, part of the ozone and oxygen generated between the anode 3 and the proton exchange membrane 4 will be discharged via the water gap 6 in the form of bubbles, these bubbles will be rebounded to the surface of the cathode 5 when reaching the top of the inner wall of the shell 1, and then will be rebounded to the water outlet 102 to be discharged, that is, the bubbles are discharged along an N-shaped path, and scale adhering to the surface of the cathode 5 will be removed by the bubbles rebounded to the surface of the cathode 5.

Figure 4:
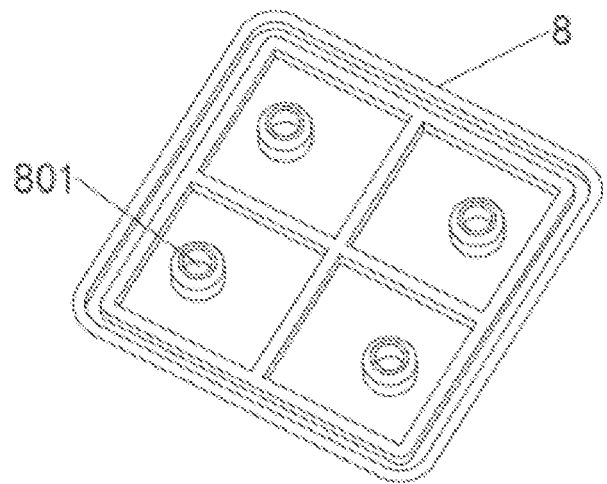
FIG. 4 is a structural diagram of a water manifold in the ozone electrolysis cell according to the invention.
Figure 5:
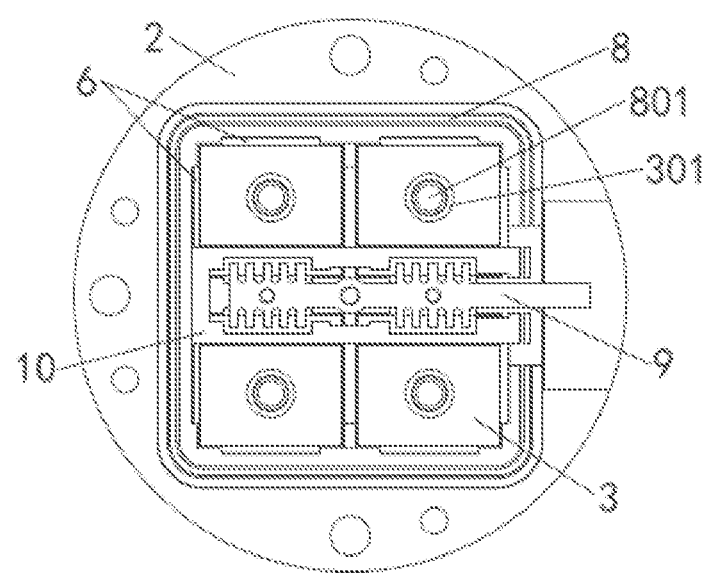
FIG. 5 is an assembly diagram of the electrode holder, an electrolysis assembly and the water manifold in the ozone electrolysis cell according to the invention.

Referring to FIG. 4 and FIG. 5, in this embodiment, a water manifold 8 is disposed at the bottom of the electrode holder 2, a plurality of third water holes 801 corresponding to the first water hole 301 are formed in the water manifold 8, and different from a disordered water flow formed in absence of the water manifold 8, a water flow entering via the water inlet 101 is divided by the water manifold 8 and is then guided to the electrolysis assembly in order via the third water holes 801, so that the electrolytic efficiency is greatly improved. In this embodiment, a mounting groove is formed in the bottom of the electrode holder 2, a mounting protrusion is disposed on an edge of the water manifold 8, and the mounting protrusion is inlaid in the mounting groove to connect and fix the water manifold 8 to the bottom of the electrode holder 2.

Figure 3:
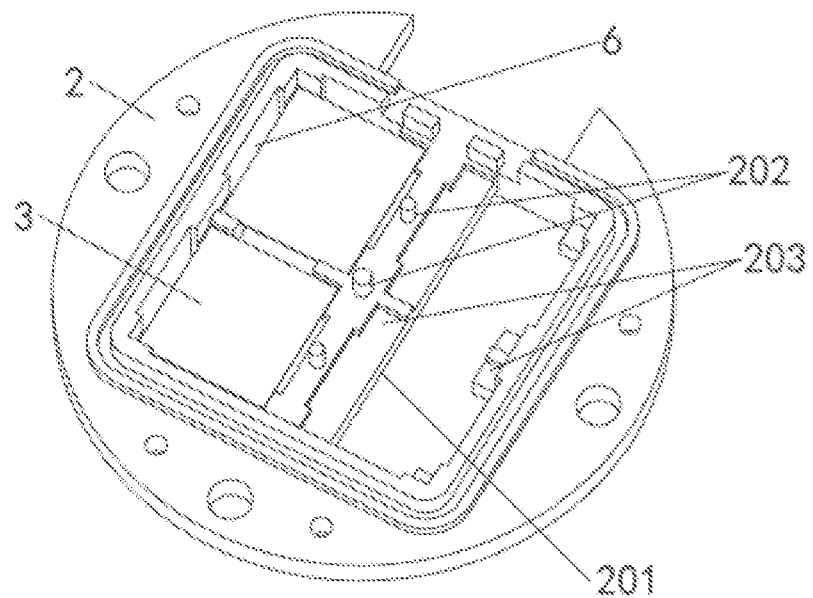
FIG. 3 is a structural diagram of an electrode holder in the ozone electrolysis cell according to the invention.

Preferably, the electrode fixing member 201 is disposed on the electrode holder 2, electrolysis assembly mounting sites 203 are formed between the electrode fixing member 201 and an inner wall of the electrode holder 2, and the electrolysis assemblies are mounted and limited at the electrolysis assembly mounting sites 203. Specifically, as shown in FIG. 3, two ends of the electrode fixing member 201 are fixedly connected to inner walls of two sides of the electrode holder 2 respectively, corner brackets are disposed on the surface of the electrode fixing member 201 and inner walls of the other two sides of the electrode holder 2 respectively, and the corner brackets on the inner wall of the two sides of the electrode holder 2 correspond to the corner brackets on the surface of the electrode fixing member 201 to form the electrolysis assembly mounting sites 203.

Referring to FIG. 5, a conductive chip 9 and a block 10 are disposed on the surface of the electrode fixing member 201, the conductive chip 9 is provided with a power pin stretching out of the electrolysis cavity and multiple conductive pins attached to the surfaces of the anodes 3, and the block 10 is pressed against the surface of the conductive chip 9. In addition, a power pin of the cathode 5 and the power pin of the conductive chip 9 stretch out of the electrolysis cavity, and the conductive chip 9 is sealed with a sealant to be completely isolated from water, the electrolysis cavity and the outside, so that electrolysis can be performed safety.

In this embodiment, a plurality of locating posts 202 are disposed on the surface of the electrode fixing member 201, locating holes matched with the locating posts 202 are formed in the surface of the conductive chip 9 and the surface of the block 10, and the conductive chip 9 and the block 10 can be located easily through the locating holes. It should be noted that the fixing manner of the block 10 is not limited. In this embodiment, in order to fix the block 10 easily, the locating posts 202 are in interference fit with the locating holes in the press block 10 to fix the block 10; or, bolt holes are formed in the block 10 and the electrode fixing member 201, and the block 10 and the electrode fixing member 201 are fixed with bolts.

In this embodiment, the anode 3 is preferably a diamond anode, and the cathode 5 is preferably a stainless steel cathode. The diamond anode and the stainless steel cathode are not prone to wastage in the electrolysis process, so that the service life of the electrolysis assembly is effectively improved.

The elastic member 7 is preferably a tower spring, a spring or an elastic piece. In this embodiment, the elastic member 7 is a tower spring, a cylindrical stop 105 is disposed on the inner wall of the shell 1, a small end of the tower spring abuts against the inner wall of the shell 1 and is matched with the cylindrical stop 105, that is, the cylindrical stop 105 is sleeved with the small end of the tower spring to stop the tower spring from moving, and a big end of the tower spring abuts against the cathode 5. After a severe electrolytic reaction, the cathode 5 can restore elastically under the action of the tower spring, so that the positional accuracy and reliability are guaranteed.

In this embodiment, the shell 1 comprises a water inlet cover 103 and a water outlet cover 104, wherein the water inlet cover 103 and the water outlet cover 104 are fixedly connected to an edge of an upper surface and an edge of a lower surface of the electrode holder 2 respectively, and the electrolysis cavity is formed between the water inlet cover 103 and the water outlet cover 104. Specifically, the electrode holder 2 is connected to the water inlet cover 103 and the water outlet cover 104 in an embedded manner through bolts, so that more electrode holders 2 can be assembled and added to obtain a higher ozone concentration in the ozone electrolysis cell.

Figure 6:
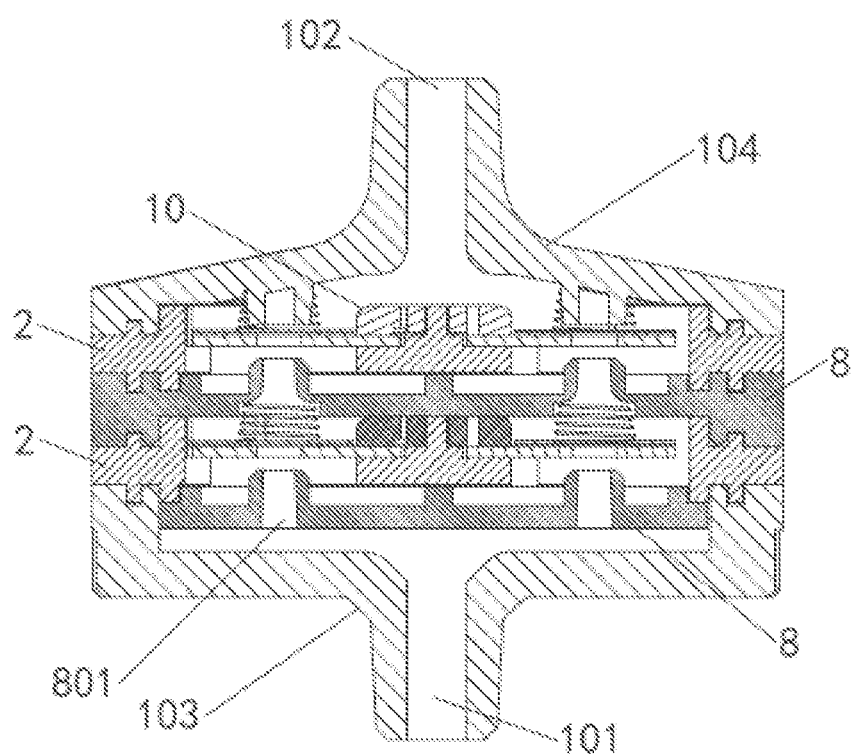
FIG. 6 is an internal structural diagram of the ozone electrolysis cell provided with two electrode holders according to the invention.

Referring to FIG. 6, in another embodiment, two electrode holders 2 are disposed in the electrolysis cavity, a water manifold 8 is disposed between the two electrode holders 2, and the water manifold 8 is connected to the upper and lower electrode holders 2 in an embedded manner through bolts. An elastic member 7 is disposed between the water manifold 8 and the lower electrode holder 2, and two ends of the elastic member 7 abut against the surface of the cathode 5 and the bottom of the water manifold 8 respectively. By increasing the number of the electrode holders 2, the ozone production efficiency and the ozone water concentration can be improved, and the situation that the entire ozone electrolysis cell cannot work when the electrolysis assembly on one electrode holder 2 fails is avoided.

The invention further provides an ozone electrolysis application module.

Figure 7:
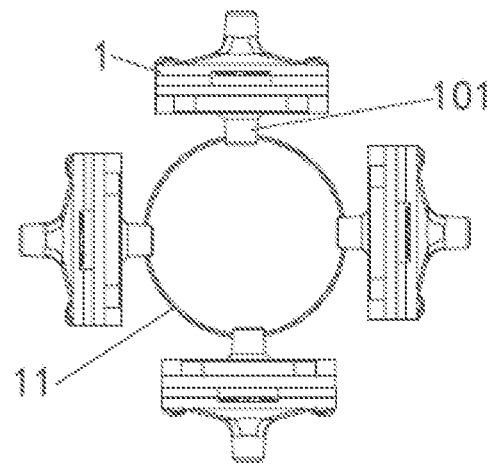
FIG. 7 is a structural diagram of Embodiment 1 of an ozone electrolysis cell application module according to the invention.

In this embodiment, the ozone electrolysis cell application module comprises a water pipe 11, wherein multiple ozone electrolysis cells are disposed on a circumferential wall of the water pipe 11, the water outlets 102 of the ozone electrolysis cells are communicated with the interior of the water pipe 11, and preferably, and the water outlets 102 are connected to the water pipe in a threaded manner. Multiple ozone electrolysis cells can be used at the same time, so that high-concentration ozone water can be generated at a high rate within a short time and be converged and output by the water pipe 11, and the application range is wide; and even if several of the ozone electrolysis cells are damaged, the entire application module can operate normally, and the damaged ozone electrolysis cells can be disassembled to be changed. Referring to FIG. 7, in this embodiment, the water pipe 11 is a circular pipe.

Figure 8:
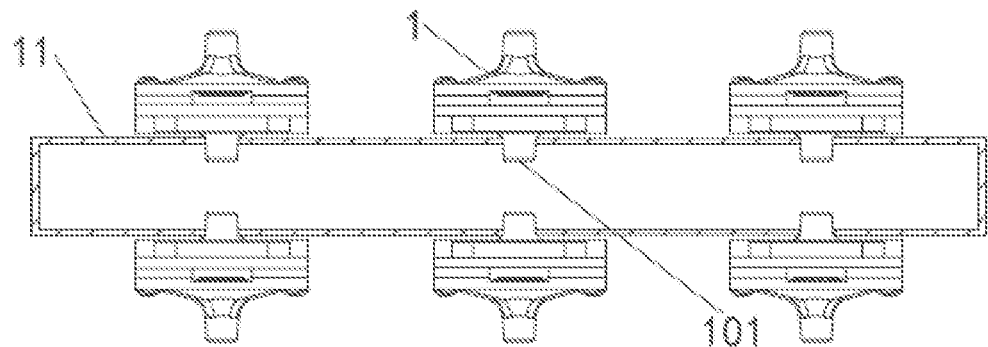
FIG. 8 is a structural diagram of Embodiment 2 of the ozone electrolysis cell application module according to the invention.

Referring to FIG. 8, in another embodiment, the water pipe 11 is a square pipe, and the ozone electrolysis cells are disposed on two sides or one side of the square pipe.

In some other embodiments, the cross-section of the water pipe is triangular or is in other shapes. The invention has no limitation in this aspect.

The above embodiments are merely preferred ones of the invention, and are not intended to limit the patent scope of the invention. All equivalent structural transformations made according to the contents in the specification and drawings, or direct/indirect applications to other relating technical fields should also fall within the protection scope of the patent of invention.

What is claimed is:

1. An ozone electrolysis cell, comprising a shell, wherein a water inlet and a water outlet are formed in two ends of the shell respectively, an electrolysis cavity is formed in the shell, at least one electrode holder is disposed in the electrolysis cavity, at least one electrolysis assembly is disposed on the electrode holder, the electrolysis assembly comprises an anode, a proton exchange membrane and a cathode which are mounted on electrode holder sequentially from bottom top, a water gap is reserved between the electrolysis assembly and an inner wall of the electrode holder, a first water hole is formed in the anode, a second water hole corresponding to the first water hole is formed in the proton exchange membrane, the first water hole is smaller than the second water hole, an elastic member is disposed in the electrolysis cavity, two ends of the elastic member abut against the cathode and an inner wall of the shell respectively, and a bottom of the electrode holder faces the water inlet;

wherein a water manifold is disposed at the bottom of the electrode holder, and a plurality of third water holes corresponding to the first water hole are formed in the water manifold.

2. The ozone electrolysis cell according to claim 1, wherein a mounting groove is formed in the bottom of the electrode holder, a mounting protrusion is disposed on an edge of the water manifold, and the mounting protrusion is inlaid in the mounting groove to connect and fix the water manifold to the bottom of the electrode holder.

3. The ozone electrolysis cell according to claim 1, wherein an electrode fixing member is disposed on the electrode holder, and electrolysis assembly mounting sites are formed between the electrode fixing member and an inner wall of the electrode holder.

4. The ozone electrolysis cell according to claim 3, wherein four said electrolysis assemblies are disposed on the electrode holder, and two said electrolysis assemblies are located on each of two sides of the electrode fixing member.

5. The ozone electrolysis cell according to claim 4, wherein a conductive chip and a block are disposed on a surface of the electrode fixing member, the conductive chip is provided with a power pin stretching out of the electrolysis cavity and multiple conductive pins attached to surfaces of the anodes, and the block is pressed against a surface of the conductive chip.

6. The ozone electrolysis cell according to claim 5, wherein a plurality of locating posts are disposed on the surface of the electrode fixing member, and locating holes matched with the locating posts are formed in the surface of the conductive chip and a surface of the block.

7. The ozone electrolysis cell according to claim 1, wherein the anode is a diamond anode, and the cathode is a stainless steel cathode.

8. The ozone electrolysis cell according to claim 1, wherein the shell comprises a water inlet cover and a water outlet cover, the water inlet cover and the water outlet cover are fixedly connected to an edge of an upper surface and an edge of a lower surface of the electrode holder respectively, and the electrolysis cavity is formed between the water inlet cover and the water outlet cover.

9. An ozone electrolysis cell application module, comprising a water pipe, wherein multiple ozone electrolysis cells according to claim 1 are disposed on a circumferential wall of the water pipe, and the water outlets of the ozone electrolysis cells are communicated with an interior of the water pipe.

* * * * *